United States Patent
Mattelet et al.

(10) Patent No.: US 11,535,175 B2
(45) Date of Patent: Dec. 27, 2022

(54) METHOD FOR FIXING A GLASS INTERIOR TRIM ELEMENT INTO A MOTOR VEHICLE

(71) Applicant: AGC GLASS EUROPE, Louvain-la-Neuve (BE)

(72) Inventors: Claire Mattelet, Brussels (BE); Pierre Humblet, Ohain (BE); Philippe Muylkens, Welkenraedt (BE); Robert Hick, Chenee (BE)

(73) Assignee: AGC GLASS EUROPE, Louvain-la-Neuve (BE)

( * ) Notice: Subject to any disclaimer, the term of this patent is extended or adjusted under 35 U.S.C. 154(b) by 431 days.

(21) Appl. No.: 15/768,221

(22) PCT Filed: Oct. 13, 2016

(86) PCT No.: PCT/EP2016/074593
§ 371 (c)(1),
(2) Date: Apr. 13, 2018

(87) PCT Pub. No.: WO2017/064187
PCT Pub. Date: Apr. 20, 2017

(65) Prior Publication Data
US 2018/0304825 A1    Oct. 25, 2018

(30) Foreign Application Priority Data
Oct. 16, 2015    (EP) .................................... 15190206

(51) Int. Cl.
*B60R 13/02* (2006.01)
*B60R 11/02* (2006.01)
(Continued)

(52) U.S. Cl.
CPC .......... *B60R 13/0256* (2013.01); *B60K 35/00* (2013.01); *B60K 37/00* (2013.01);
(Continued)

(58) Field of Classification Search
CPC ............. B60R 13/0256; B60R 11/0229; B60R 13/0206; B60R 13/0243; B60K 35/00;
(Continued)

(56) References Cited

U.S. PATENT DOCUMENTS

| | | | | |
|---|---|---|---|---|
| 5,952,630 A | * | 9/1999 | Filion | B60N 2/797 200/5 R |
| 6,997,494 B2 | * | 2/2006 | Neumann | B60R 11/02 296/1.09 |

(Continued)

FOREIGN PATENT DOCUMENTS

| | | |
|---|---|---|
| FR | 2 719 390 A1 | 11/1995 |
| GB | 2 416 338 A | 1/2006 |
| WO | WO 2015/011041 A1 | 1/2015 |

OTHER PUBLICATIONS

International Search Report dated Jan. 23, 2017 in PCT/EP2016/074593 filed Oct. 13, 2016.

*Primary Examiner* — Joseph D. Pape
(74) *Attorney, Agent, or Firm* — Oblon, McClelland, Maier & Neustadt, L.L.P.

(57) ABSTRACT

Method for fixing a glass interior trim element into a motor vehicle. The invention relates to method for fixing a glass trim element into a motor vehicle's interior characterized in that the method comprises a step of fixation of the glass element to a support to provide an assembly that is integrated to motor vehicle's interior body.

20 Claims, 5 Drawing Sheets

(51) Int. Cl.
*B60K 35/00* (2006.01)
*B60K 37/00* (2006.01)
*C03C 3/076* (2006.01)
*C03C 3/078* (2006.01)
*C03C 3/083* (2006.01)
*C03C 3/085* (2006.01)
*C03C 3/087* (2006.01)
*C03C 3/089* (2006.01)
*C03C 3/091* (2006.01)
*B60N 2/75* (2018.01)
*B60K 37/06* (2006.01)
*G06F 3/041* (2006.01)

(52) U.S. Cl.
CPC ...... *B60R 11/0229* (2013.01); *B60R 13/0206* (2013.01); *B60R 13/0243* (2013.01); *C03C 3/076* (2013.01); *C03C 3/078* (2013.01); *C03C 3/083* (2013.01); *C03C 3/085* (2013.01); *C03C 3/087* (2013.01); *C03C 3/089* (2013.01); *C03C 3/091* (2013.01); *B60K 37/06* (2013.01); *B60K 2370/1537* (2019.05); *B60K 2370/81* (2019.05); *B60N 2/75* (2018.02); *B60R 2013/0281* (2013.01); *B60R 2013/0287* (2013.01); *G06F 3/041* (2013.01)

(58) Field of Classification Search
CPC ......... B60K 37/00; C03C 3/076; C03C 3/078; C03C 3/083; C03C 3/085; C03C 3/087; C03C 3/089; C03C 3/091
USPC ...................................... 296/70, 24.34, 1.08
See application file for complete search history.

(56) References Cited

U.S. PATENT DOCUMENTS

| | | | |
|---|---|---|---|
| 7,926,845 B2* | 4/2011 | Sato | B60K 37/00 280/779 |
| 8,486,535 B1 | 7/2013 | Nemeth et al. | |
| 8,991,772 B2* | 3/2015 | King, II | B60R 11/0211 248/200 |
| 9,238,759 B1 | 1/2016 | Nemeth et al. | |
| 2006/0000149 A1* | 1/2006 | Radu | B60J 5/0416 49/502 |
| 2006/0017326 A1 | 1/2006 | Hein et al. | |
| 2007/0041169 A1* | 2/2007 | Konet | B60Q 3/82 362/84 |
| 2007/0158966 A1* | 7/2007 | Tomasson | B60R 13/0262 296/24.34 |
| 2009/0183436 A1* | 7/2009 | Dry | B60R 13/0243 49/502 |
| 2011/0091704 A1* | 4/2011 | Akiba | C03C 3/085 428/220 |
| 2012/0133169 A1* | 5/2012 | George | B60R 13/0206 296/1.08 |
| 2012/0169861 A1 | 7/2012 | Szczerba et al. | |
| 2015/0035310 A1* | 2/2015 | Yamaguchi | B60R 13/0206 296/153 |
| 2015/0268746 A1 | 9/2015 | Cuddihy et al. | |
| 2016/0168012 A1 | 6/2016 | Lambricht et al. | |
| 2016/0361837 A1* | 12/2016 | Hayes | B29C 51/10 |
| 2017/0059749 A1* | 3/2017 | Wakatsuki | C03B 23/02 |
| 2018/0370843 A1* | 12/2018 | Gross | C03C 3/097 |

* cited by examiner

METHOD FOR FIXING A GLASS INTERIOR TRIM ELEMENT INTO A MOTOR VEHICLE

The present invention relates to a method for fixing a glass interior trim element into a motor vehicle. Particularly, the present invention concerns center console for a motor vehicle, comprising a console body and trim elements mounted on the console body.

BACKGROUND

Interior trim vehicle refers to the items that can be added to the interior of an automobile or a motor vehicle in general (car, bus, train . . . ) to increase its appeal. There are several types of vehicle trim. Some are used to protect some part of the interior vehicle from unwanted damage that can be caused by the passenger, while others are simply for aesthetics.

Also, in many vehicles and particularly cars, a vehicle console is disposed between left and right front seats. Typically, the center console is anchored to the dashboard of the car and extends on that part. The center console can also be installed to the left and right of the back seats. In order to make the interior of the car more beautiful and comfortable, usually decorated panels covering the exposed parts of the center console (such as a CD player, controls for audio, climate, the infotainment etc . . . ) are mounted on the center console and particularly on the upper side of the center console.

Generally, the top part of the center console is made of plastics, polycarbonate elements (plastics materials are used as a cover to the whole console system). This solution is often aesthetic but does not allow adding directly some functions on the center console as such "touch screen functionalities" with good efficiency . . . . Furthermore, the disadvantages of having a plastics molded center console are the following: since there is no touch functionality permitted with plastics, an overload of useless buttons must be installed on the console. At the end of the day, the multitude of buttons confuses the driver (safety aspect). Additionally, because there is no seamless effect, it is more difficult to clean the center console as the dust is incrusted around the buttons, etc . . . (hygiene downside). The plastic material used to cover the center console is hardly recyclable whereas glass is endlessly recyclable (environmental issue). The molding process of the plastic parts results in plastics ending up as wastes (recyclable plastics prices are not competitive with newer plastics prices, therefore there is currently no viable alternative to address this environmental concern). In general, plastics material used a glass cover are not highly resistant to UV and the transparent tint turns into yellow with time (deterioration of the design). Additionally, in order to present a similar stiffness than glass, a cover made of plastics will be heavier than one made of glass. Therefore, plastics material solutions are not optimal for this car part in order to lighten the car. As technology cycles go faster and faster, a glass center console would allow flexibility for IT upgrades to be made and allows for seamless connectivity with nomadic devices. By having a glass center console, it would allow to reconcile the many different softwares that are typically supported by the car into one Operating System located and commanded from the same place. Additionally, in contrast to most of the materials currently used as parts of the center console, glass can support the use of ambient light (improving the comfort/convenience of the passengers). Furthermore, the passenger does not want to see anymore plastic in his interior's car similarly to his house or his office interior's.

The current interior decorative or functional parts are mainly made of decorative plastics. Therefore, fixation elements can be directly integrated to these parts. However, the plastic parts have the disadvantage to be damaged when being touched and over the life time of the vehicle, due to their low resistance to abrasion. Furthermore, the effect of having plastic in the car for the user interface (visible decoration or functional panel) is not optimal for the high-end finishing, plastics being considered as a low quality material. Another criteria is the feeling when touching plastic, user feels to touch a weak material, and the sensation at fingertips is hot and soft, giving the impression of a low end material. The current solutions therefore do not need to integrate specific intermediate parts for assembly.

Thus, glass trim elements or a glass console are preferred to have a better aesthetic and allow to increase the appeal of the vehicle. Unluckily, glass trim elements are more difficult to fix to the interior's vehicle.

Thus, it is an object of the present invention to provide a method for fixing a glass trim element into motor vehicle's interior.

BRIEF SUMMARY

For avoidance of doubt, the present invention is applicable for all means of transport such as automotive, train, plane . . .

According to the invention, the method comprises a step of fixing the glass trim element to a support to provide an assembly that is integrated to a motor vehicle's interior body.

Thus, the present invention relates in a preferred embodiment to a method comprising a step of fixing the glass trim element to a support to provide an assembly that is integrated to car's interior body, wherein the glass trim element is an upper part provided on a console base. In a preferred embodiment of the present invention, the invention concerns as a motor vehicle a car.

According to one embodiment of the present invention, the glass trim element may extend from the console base to cover entirely or partially the dashboard. The glass trim element may be made in one or several pieces.

Thus, thanks to the present invention, a large glass trim element may be used as a motor vehicle's interior glass trim element.

BRIEF DESCRIPTION OF THE DRAWINGS

The invention will now be explained in more detail below with reference to the attached drawings.

DETAILED DESCRIPTION

Figure 1:
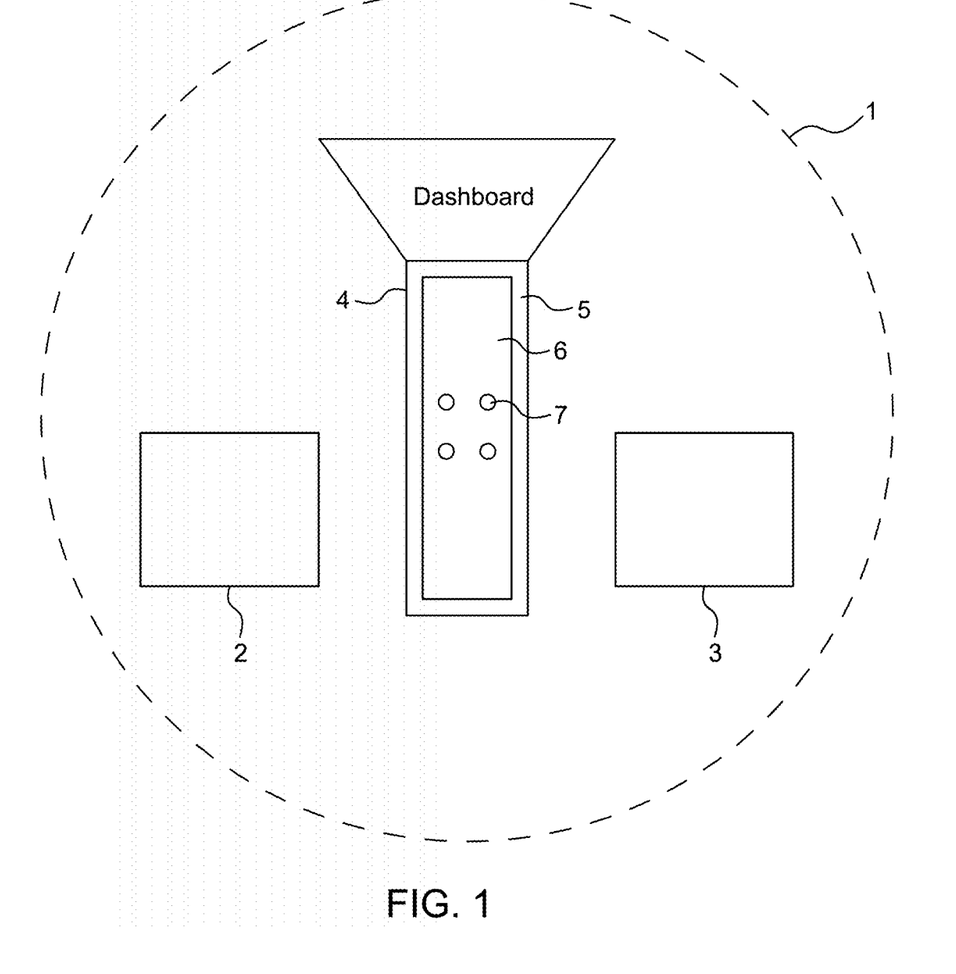
FIG. 1 shows a schematic of an automotive interior with center console.
Figure 2:
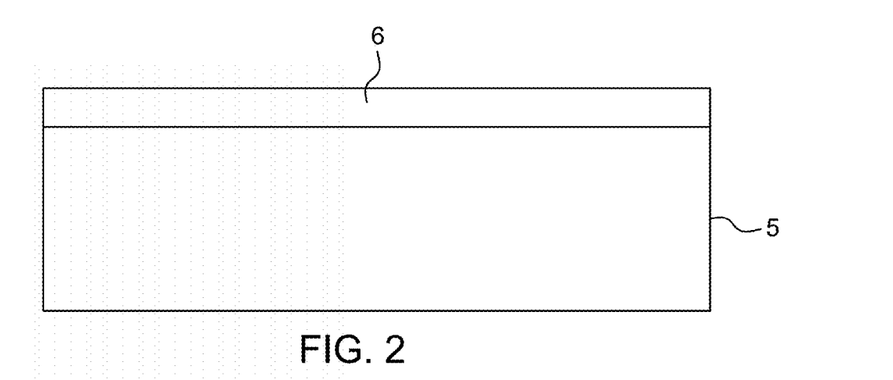
FIG. 2 shows an example of a cross section of the glass trim element and frame in accordance with an embodiment of the invention.

The invention, as shown for example in non-limiting FIG. 1, relates to the fixing of a frame 2 coupled to the glass trim element 3 to form a combined glass trim element 1 which is characterized to limit the deformation of the glass allowing at the same time to absorb the energy in case of static and dynamic loading/shock thanks to the appropriate construction. A top view of an exemplary combined glass trim element 1 is shown in FIG. 2.

According to the present invention, the frame will be preferentially made out of thermoplastics material, or steel, or composite material, or a combination of those, in order to bring to the module glass with frame a sufficient rigidity to reduce the glass deformation and reduce the risk of glass breakage.

Figure 3:
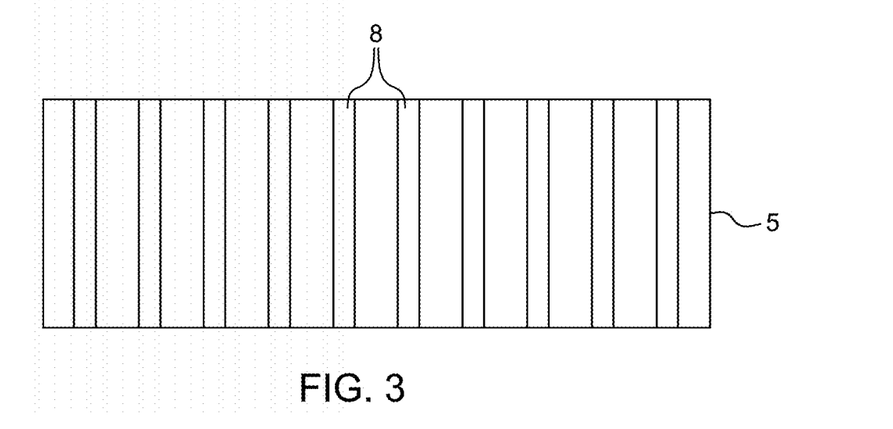
FIG. 3 shows a bottom perspective views of a support of an embodiment of the invention.

Preferably, as shown for example in FIG. 3, the frame 5 will be designed with structural ribs 8 in order to reinforce significantly the mechanical resistance of the module "glass/frame" to make it very rigid.

Possibly, the rigid assembly will be combined to elements below this assembly, these elements will be made to resist to a static load applied to the assembly but out of brittle material or with a mechanism in order to break in case of excessive load, as for instance a crash.

This combination of a rigid frame to sustain the glass and avoid glass deformation, with fixing elements will be preferentially made with the purpose of developing a safe product to respect among others regulation such as regulation R21 of the European norms E/ECE/324, E/ECE/Trans/505 but as well to provide design which satisfy the requirements.

According to one preferred embodiment of the present invention, the support to provide an assembly that is integrated to motor vehicle and particularly car's interior body is a frame made of plastic.

Thus, the invention proposes to use plastic as intermediate material and use glass for some of the user interface parts. More specifically, the areas that are often touched by the user as decorative parts and/or as functional parts will be replaced by glass and the plastic material will be used in order to be assembled to the glass and connected to the inner body of the car. The current invention is taking the advantage that the plastics can be easily adapted and formed by different processes, and can also be fixed to the glass. Therefore all the fixing elements can be included inside the plastic frame that will be fixed to the glass, which will be used as user interface and providing a much better finishing aspects to the user.

According to one embodiment of the present invention, the glass trim element is a trim element mounted onto the upper part of a center console body on which functional elements and at least one trim element are mounted, or for all other decorated area where glass could be used such as the door inner trim. The glass trim element may extend form the console base to cover entirely or partially the dashboard.

According to one embodiment of the present invention, the center console of a vehicle and more particularly a car comprises a console body and at least one trim element disposed on the upper part of the console body. The center console 4 is located between left and right seats 2 and 3 in a vehicle interior 1 as illustrated, for example, in FIG. 1. The trim element may extend from the rear part of the center console placed between the left and right front seats to the lower part of the dash board. For example three trim elements may be used to cover the upper part of the center console. It is understood that the console body and trim element may extend between the left and right back seats. The upper trim element may cover the upper part of the center console from the mid part of the center console to part just above the dashboard. This trim element may be flat or with a weak curvature. Some access to functional parts may be provided through this trim element. The middle part presents a curvature to conectly fit with the design of the center console. The middle part may show an opening to have an access to functional buttons to control for example sound, air conditioning . . . . The opening may be covered by another piece of glass sheet which may be openable, for example by a sliding movement. However, in one other embodiment of the invention, the functional buttons placed into the trim elements may be replaced by touch functions with lead to suppress anesthetic functional buttons which generally protrude from the center console. Finally, the third trim element may cover the part located between the left and right front seats. This trim element in this specific embodiment presents some holes for example storage compartment or for cup holders systems.

In one embodiment, a storage compartment may be provided between the left and right front seats. In a preferred embodiment, the storage compartment is cover by a fourth trim element made also of glass sheet, corresponding to an openable lid. Then, the trim element may preferably extend to the compartment lid.

In another embodiment of the invention, the upper trim element extends to the dashboard and integrates a display panel as such a GPS, CD/audio player screen . . . .

According to the invention, the trim elements are made of glass sheet. Preferably, the trim elements are made of a soda-lime-silica as described below.

It is understood that the different trim elements may be made of the same glass or may be different to answer to different specifications requested by the car maker.

Figure 5:
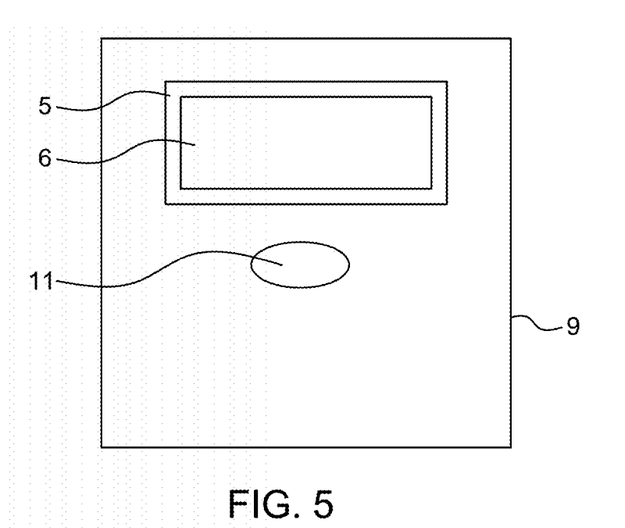
FIG. 5 shows a side view of a door having a trim element in accordance with the invention.
Figure 6:
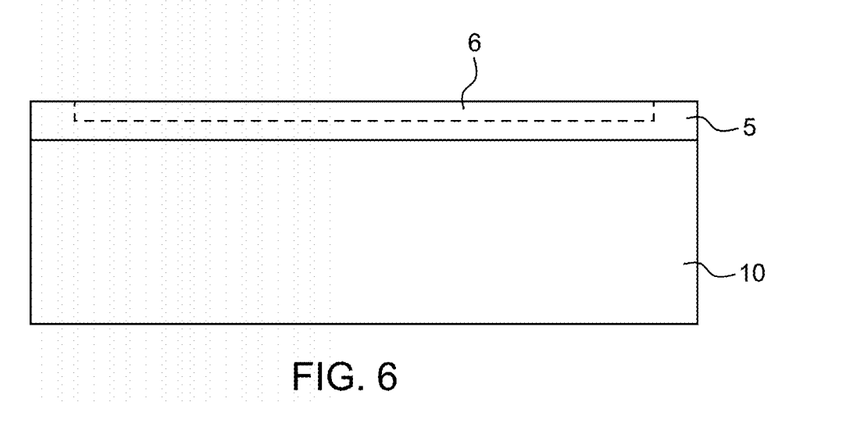
FIG. 6 shows a side view of an armrest with a trim element in accordance with the invention.

According to one embodiment of the present invention, the trim or decorative elements may be present in the interior of a motor vehicle and particularly a car, as doors handles contours, door panels, trim elements of the dashboard, back of seats. For example, and as shown in FIGS. 5 and 6, the glass trim element 6 is provided with a frame 5 as a part of a cover for a door cover 9 having a handle 11 or as a cover for an armrest 10.

Figure 7:
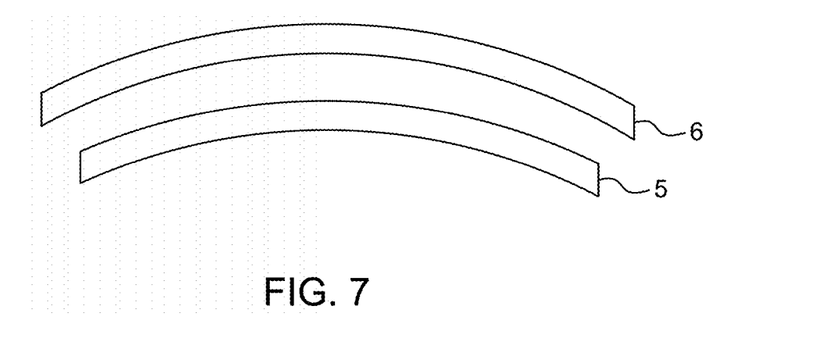
FIG. 7 shows a side view of a glass trim element and corresponding support.

According to one embodiment of the present invention, the support to provide an assembly that is integrated to motor vehicle's and more particularly a car's interior body 1 is a frame 5 made of plastic which matches the shape curvature of the glass trim element 6 as shown in FIGS. 1, 2, and 7.

According to one embodiment of the present invention, the glass trim element is beforehand assembled to a plastic frame before being integrated to car's interior body.

According to one embodiment of the present invention, the plastic frame is provided on the back of the glass trim element.

Figure 4:
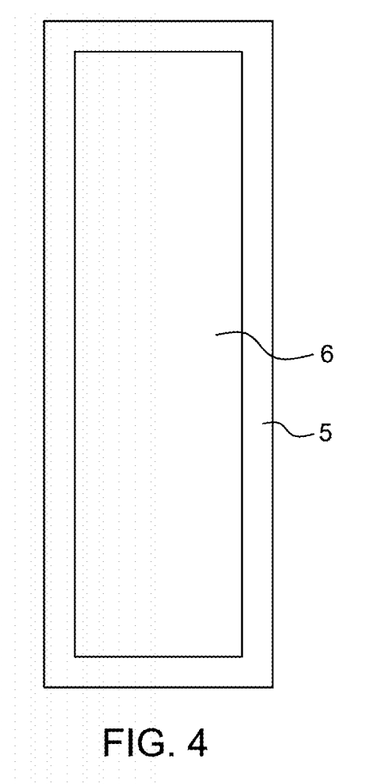
FIG. 4 shows a top view of the trim and support in accordance with an embodiment of the invention.
Figure 4A:
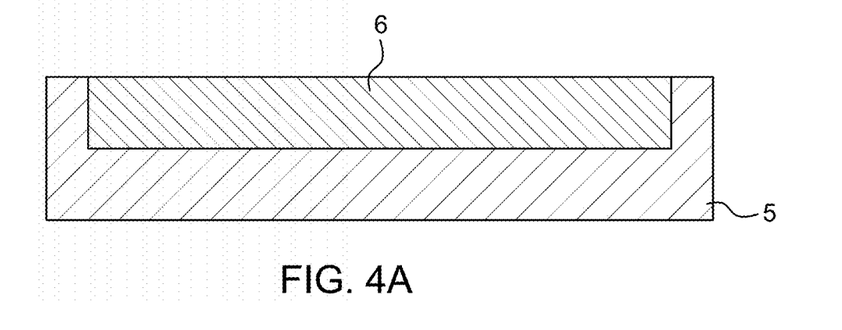
FIG. 4A shows a cross sectional view of the trim and support of FIG. 4.

According to another embodiment of the present invention the plastic frame 5 is provided below and around the glass trim element 6 as shown in FIGS. 4 and 4A.

According to one embodiment of the present invention, the plastic frame is provided on the glass trim by gluing, using a tape, a thermoplastic or a thermoset or even by mechanical fixation such as clips or screws.

According to the present invention, the plastic frame may be produced by known encapsulation processes or by 3D-printing or by all suitable processes to produce such a plastic frame.

The connection of the plastic frame to the glass can be done by different means such as glues mono or bi-components, tapes, thermoplastics, thermosets or mechanical fixation such as clips, screws The assembly of the rigid frame to the glass structure is made with an appropriate material to withstand the thermal expansion difference of the different material. Thus the use of a viscoelastic material as mentioned, such as preferably a glue (PU, Silicon, MS Polymer) or a thermoplastics elastomers with an appropriate shear strain between 10% to 300% or higher, in order to cope to the dimensional variations resulting from the different thermal expansion coefficient of the material used in the assembly.

Furthermore, the plastic frame shape can be adapted to match every geometry of the glass, including, for example, a hole made in the glass to integrate a storage box in case of a central console. The storage box might be closed with a moving cover in glass as well to give the same high end level of finishing, and this cover could be connected to the rest of the body using the same interface through a plastic frame. The plastic interfacing structure offering the advantages that it can integrate a mechanism for such application.

According to one embodiment of the present invention, the plastic frame is made of a material chosen among thermoplastics such as for example Polybutylene terephthalate (PBT), Polycarbonate-Acrylonitrile Butadiene Styrene (PC-ABS), Polyamide (PA6), Polyamide copolymer (PA66), Polyoxymethylene (POM), Polypropylene (PP), Thermoplastic elastomers (TPE) or thermosets material such as Polyurethane (PUR), Epoxies (EP) with or without fillers to bring additional properties, such as glass fibers for mechanical reinforcement.

According to one embodiment of the present invention, the glass element can be provided with a safety backing to improve the safety of the glass and prevent fragement to spread in the vehicle in case of breakage. The defined frame of the invention is also applicable for fixation to glass with such safety backing.

The invention relates to the use of a plastic frame to be coupled with the glass on the back side and integrate to this plastic frame some function such as: reinforcement to meet specifications under loads, fixation points to the car inner body, fixation shape to the glass, geometrical aspects to match the expectations for fixation to the functional/decorative elements as well as for connection to vehicle interface.

The main functions of the frame can be list as:
playing the role of an interface glass/body
reinforcing of the sub assembly that can advantageously be adapted in accordance with the glass used
using as well as support for other decorative elements such as bright molding edge, panels, . . .
being slightly visible and therefore have aesthetic function in some area without impacting the advantage brought by the glass
using as substrate and/or masking of different function, such as connecting to bring added value to the subassembly through the frame and/or the glass. Among others the added values and the connecting elements through the frame can be touch function in the glass, buttons, edge lighting, leds, screens, sound devices, vibrating devices . . .
using as partial support for small pieces of glasses that can be added to the main console in order to bring decorative aspects. The decoration can be, among others, colored glass, glass with engravings, glass with light integration and the frame used as support for the cables.
Reducing noise/vibration between the glass cover and the main inner body of the motor vehicle
Ensuring the minimum glass deformation but allowing the appropriate energy absorption in occurrence of specified shock/impacts.

According to another embodiment of the present invention, the support to provide an assembly that is integrated to motor vehicle and particularly car's interior body may be a frame made of metallic material such as zamac, aluminum, magnesium (Thixomolding), . . .

According to the invention, the at least one trim element is made of glass sheet.

According to one embodiment of the present invention, the console body is mounted on the floor panel of the vehicle. Generally, the console body includes a console base mounted on the floor panel, left and right support frames extending upward from left and right side portions of the console base section.

Generally, on the upper side of the console body, functional parts and trim elements are attachable. Trim elements are generally attached to cover or surround some functional parts (such as a CD player, air conditioning controllers, etc . . . ).

According to one embodiment of the invention, trim elements extend from the rear of the center console to the dashboard of the vehicle. The terms front and rear in the context of the present invention, relate to a front end and rear end of the motor vehicle.

According to another embodiment of the invention, the functional parts may be directly managed from the trims elements thanks to "touch function" providing a touch panel. Thus, the trims elements made of glass sheet may host different functionalities around electronic gadgetry and vehicle control information, connectivity, touch, display and audio. Thus the upper part of the center console may be made of glass sheet in a larger part of the upper part of the center console, without anesthetically buttons to control for example audio control volume and on/off, engine start/stop system, head up display control system, glazing opening, display system control, allows circulation of information display in the car on the different glass panels, control of SMART glazings, etc. According to this embodiment, the touch panel may be curved for improved ergonomics conditions of drivers/passengers (view adaptation and glare related issues). Cavities on trim elements can be processed to provide haptic feedback on a plain glass sheet for easy detection of touch sensors (for safety reason of the driver).

In a preferred embodiment of the invention, the trim elements are made in one piece of glass sheet extended from the rear of the console body to the dashboard wherein touch functions are integrated.

The trim elements may be extended to a display panel provided on the dashboard thus given the sensation to have only one piece of glass sheet from the rear of the center console to the dashboard.

According to another embodiment of the invention, center console can be made of several pieces of glass sheet, depending on the needs for harbouring functions.

According to another embodiment of the invention, some lighting means as for example OLED, LED, special glass paint/enamel backing, may be integrated into the center console or on its edges. A polycarbonate plate may be provided behind the glass trim element in order to better diffuse the light.

In another preferred embodiment of the invention, the trim elements are made in one piece of glass sheet extended from the rear of the console body to the dashboard wherein openings are arranged to provide an access to functional parts. Such openings may be covered by openable piece of glass sheet.

According to one embodiment of the invention, the trim elements may be glued or fixed to the console body by encapsulation.

Advantageously, the center console has an upward opening and capable of storing therein baggage providing a storage compartment. For opening the storage compartment of the console body, the vehicle center console has a first opening mode for opening the compartment of the console base by for example, sliding the trim elements. Then, the storage compartment lid is made of glass sheet and can be encapsulated for instance with PU, TPE, PVC, LCP, TPO or similar materials in order to be flush with the rest of the center panel when closed. This encapsulation is not limited to this area of the center console.

According to the invention, the center console is made of flat glass sheet which can be bended or thermoformed to adapt with the shape of the car. The flat glass sheet may be processed to be decorative or in order to give an access to CD, plugs, storage compartment, cup holders systems, buttons, gearstick, cigarette lighter or auxiliary power point, audio controls, the climate control/air condition system and possibly a display screen (or other type of system requiring a hole drilled in the glass sheet surface).

The glass according to the invention is made of glass which can belong to various categories. The glass can thus be a glass of soda-lime-silica, aluminosilicate or borosilicate type, and the like. Preferably and for reasons of lower production costs, the glass sheet according to the invention is a sheet of soda-lime-silica glass.

In one non-limiting embodiment, the basic composition of the glass according to the invention comprises, in a content expressed as percentages by total weight of glass:

| | |
|---|---|
| $SiO_2$ | 55-85% |
| $Al_2O_3$ | 0-30% |
| $B_2O_3$ | 0-20% |
| $Na_2O$ | 0-25% |
| CaO | 0-20% |
| MgO | 0-15% |
| $K_2O$ | 0-20% |
| BaO | 0-20%. |

In another embodiment, the basic composition of the glass according to the invention comprises, in a content expressed as percentages by total weight of glass:

| | |
|---|---|
| $SiO_2$ | 55-78% |
| $Al_2O_3$ | 0-18% |
| $B_2O_3$ | 0-18% |
| $Na_2O$ | 0-20% |
| CaO | 0-15% |
| MgO | 0-10% |
| $K_2O$ | 0-10% |
| BaO | 0-5% |

In another embodiment and for reasons of lower costs, the glass is a a soda-lime glass. Advantageously, the basic composition of the glass according to the invention comprises, in a content expressed as percentages by total weight of glass:

| | |
|---|---|
| $SiO_2$ | 60-75% |
| $Al_2O_3$ | 0-6% |
| $B_2O_3$ | 0-4% |
| CaO | 0-15% |
| MgO | 0-10% |
| $Na_2O$ | 5-20% |
| $K_2O$ | 0-10% |
| BaO | 0-5%. |

According to an advantageous embodiment of the invention, the composition of the glass sheet may additionally comprise one or more component (s)/colorant(s) in an appropriate amount as a function of the effect desired. This/these component (s)/colorant(s) may be used, for example, to "neutralize" the colour generated by for example the presence of the chromium and thus to render the colouring of the glass of the invention more neutral or colourless. Alternatively, this/these colorant(s) may be used to obtain a desired colour other than that which can be generated by for example the presence of the chromium.

In a preferred embodiment of the present invention, and particularly when touch functions are expected on the glass sheet of the center console, the glass sheet preferably has special enhanced infrared transmission properties in order to enhance the performances of the glass. By virtue of its high transmission of infrared radiation, a such glass sheet may advantageously be used in a touchscreen or touch panel or touchpad using the Planar Scatter Detection (PSD) or Frustrated Total Internal Reflection (FTIR) optical technology to detect the position of one or more objects (for example a finger or a stylus) on a surface of the said sheet. Thus, a solution proposed in the present invention to provide a glass with a high reflection in infrareds (RIR) consists of integrating in the glass composition chromium in a specific range contents.

Thus, according to one embodiment of the present invention, the glass sheet preferably has a composition which comprises a content expressed as percentages by total weight of glass:

| | |
|---|---|
| Total Iron (expressed in the form of $Fe_2O_3$) | 0.002-0.06% |
| $Cr_2O_3$ | 0.0001-0.06%. |

Such glass compositions combining low content of iron and chromium have shown some particularly good performances in terms of infrared reflection (RIR) and show a high transparency in the visible. These compositions are described for example in the following documents: WO2014128016A1, WO2014180679A1, WO2015011040A1, WO2015011041A1, WO2015011042A1, WO2015011043A1 and WO2015011044A1.

According to another embodiment of the present invention, the glass sheet has a composition which comprises:

| | |
|---|---|
| Total Iron (expressed in the form of $Fe_2O_3$) | 0.002-0.06% |
| $Cr_2O_3$ | 0.0015-1% |
| Co | 0.0001-1%. |

Such chromium and cobalt based glass compositions have shown particularly good performances in terms of infrared reflection RIR while offering interesting possibilities in terms of aesthetics/color (from blue to intense coloration neutrality or up opacity). Such compositions are described in European patent application No. 13 198 454.4.

According to another embodiment of the present invention, the glass sheet has a composition which comprises a content expressed as percentages by total weight of glass:

| | |
|---|---|
| Total iron (expressed in the form of $Fe_2O_3$) | 0.02-1% |
| $Cr_2O_3$ | 0.002-0.5% |
| Co | 0.0001-0.5%. |

Preferably, in this embodiment, the composition comprises 0.06%<total iron≤1%.

Such compositions based on chromium and cobalt are used to obtain colored glass sheets in the blue-green range, comparable in terms of color and light transmission with blue and green glasses on the market, but with performance particularly good in terms of infrared reflection. Such compositions are described in European patent application EP15172780.7.

According to another embodiment of the present invention, the glass sheet has a composition which comprises a content expressed as percentages by total weight of glass:

| | |
|---|---|
| total iron (expressed in the form of $Fe_2O_3$) | 0.002-1% |
| $Cr_2O_3$ | 0.001-0.5% |
| Co | 0.0001-0.5%. |
| Se | 0.0003-0.5%. |

Such glass compositions based on chromium, cobalt and selenium have shown particularly good performances in terms of infrared reflection while offering interesting possibilities in terms of aesthetics/color (gray neutral to slight staining intense in the gray-bronze range). Such compositions are described in European patent application EP15172779.9.

According to another embodiment of the invention, the composition of the glass sheet comprises the following in weight percentage, expressed with respect to the total weight of glass:

| |
|---|
| 65 ≤ $SiO_2$ ≤ 78% |
| 5 ≤ $Na_2O$ ≤ 20% |
| 0 ≤ $K_2O$ < 5% |
| 1 ≤ $Al_2O_3$ < 6% |
| 0 ≤ CaO < 4.5% |
| 4 ≤ MgO ≤ 12%; |
| as well as a (MgO/(MgO + CaO)) ratio ≥ 0.5. |

In another embodiment of the invention, the composition of the glass sheet comprises the following in weight percentage, expressed with respect to the total weight of glass:

| |
|---|
| 65 ≤ $SiO_2$ ≤ 78% |
| 5 ≤ $Na_2O$ ≤ 20% |
| 1 ≤ $K_2O$ < 8% |
| 1 ≤ $Al_2O_3$ < 6% |
| 2 ≤ CaO < 10% |
| 0 ≤ MgO ≤ 8%; |
| a $K_2O/(K_2O + Na_2O)$ ratio of from 0.1 to 0.7. |

Some others composition of glass may be used, such compositions are for example described in the following documents: EP14 167 942.3, EP14 177 487.7.

According to another advantageous embodiment of the invention, which may be combined with the preceding embodiment, the glass sheet can be coated with a layer or a film which makes it possible to modify or neutralize the colour which may be generated by for example the presence of the chromium (for example a coloured PVB film).

The glass sheet according to the invention may advantageously be chemically or thermally tempered in order to avoid scratches and to enhance the resistivity of the upper part of the center console.

According to another embodiment of the invention, the at least one trim element is made of chemically strengthened glass sheet, flat or bended. Typically, chemical strengthening is performed by exchanging Na+ ions by K+ ions at the surface of the glass sheet by dipping the glass sheet in a molten salt bath at a temperature below the glass transition temperature. Advantageously, the bath consist of high purity KNO3 and the treatment is performed at temperature between 350° C. and 470° C., for 1 to 24 hours. Chemical strengthening is preferably applied for glass sheet of thickness below 3 mm, more preferably below 2 mm and even more preferably below 1 mm, or even better below 0.7 mm.

According to one embodiment of the invention, the glass sheet is coated with at least one transparent and electrically conducting thin layer. A transparent and conducting thin layer according to the invention can, for example, be a layer based on $SnO_2$:F, $SnO_2$:Sb or ITO (indium tin oxide), ZnO:Al or also ZnO:Ga.

According to another advantageous embodiment of the invention, the glass sheet is coated with at least one antireflection layer. An antireflection layer according to the invention may, for example, be a layer based on porous silica having a low refractive index or it may be composed of several layers (stack), in particular a stack of layers of dielectric material alternating layers having low and high refractive indexes and terminating in a layer having a low refractive index. A textured glass sheet may be also used to limit the reflection inside the vehicle. Etching or coating techniques may as well be used in order to avoid reflection.

According to another embodiment, the glass sheet is coated with at least one anti-fingerprint layer or has been treated so as to reduce or prevent fingerprints. This embodiment is also advantageous in the case of use of the glass sheet of the invention as front face of a touchscreen. Such a layer or such a treatment may be combined with a transparent and electrically conducting thin layer deposited on the opposite face. Such a layer may be combined with an antireflection layer deposited on the same face, the anti-fingerprint layer being on the outside of the stack and thus covering the antireflection layer.

According to the applications and/or properties desired, other layers can be deposited on one and/or the other face of the glass sheet according to the invention.

The glass sheet according to the invention may be a glass sheet obtained by a floating process, a drawing process, a rolling process or any other process known to manufacture a glass sheet starting from a molten glass composition. According to a preferential embodiment according to the invention, the glass sheet is a float glass sheet. The term "float glass sheet" is understood to mean a glass sheet formed by the float glass process, which consists in pouring the molten glass onto a bath of molten tin, under reducing conditions. A float glass sheet comprises, in a known way, a "tin face", that is to say a face enriched in tin in the body of the glass close to the surface of the sheet. The term "enrichment in tin" is understood to mean an increase in the concentration of tin with respect to the composition of the glass at the core, which may or may not be substantially zero (devoid of tin).

The glass sheet according to the invention can have a thickness varying between 0.1 and 25 mm. Advantageously, in the case of the application of touch panels, the glass sheet according to the invention can have a thickness varying between 0.1 and 6 mm. Preferably, in the case of the touch screens application, for reasons of weight, the thickness of the glass sheet according to the invention is from 0.1 to 2.2 mm.

According to the invention, the glass sheet presents a curvature to correctly fit with the upper part of the center console and its particular design.

In order to provide a better esthetic of the center console, the trim elements may be made of a digital or silk screen printed glass sheet, an etched glass sheet, a painted/enameled glass sheet, a casted glass sheet, an anti-bacterial glass sheet, a colored float glass sheet.

According to another embodiment of the invention, the trim elements are made of laminated glass sheet. According to this embodiment, at least one thermoplastic interlayer is used to laminate at least two glass sheets. Advantageously, a colored or active interlayer may be present between the at least two glass sheets. The interlayer or a layer between the glass and the interlayer might have a low refractive index (<1.43, <1.4, <1.38, . . . <1.3) to ensure TIR in the upper glass, if compatible from IR absorption point of view.

According to another embodiment of the invention, the at least one trim element is made of heat treated glass sheet, for example annealed or tempered and/or bended glass sheet. Typically, this involves heating the glass sheet (coated or not) in a furnace to a temperature of at least 580° C., more preferably of at least about 600° C. and still more preferably of at least 620° C. before rapidly cooling down the glass substrate. This tempering and/or bending can take place for a period of at least 4 minutes, at least 5 minutes, or more in different situations.

According to one embodiment of the present invention, the glass trim element may be a cover glass combined with a polycarbonate plate glued for example behind the cover glass and potentially a display glued behind.

Thus, a glass trim element or a center console comprising at least trim element made of glass sheet according to the invention may provide a glass trim element or a center console having one or more of the following advantages:
- a higher mechanical/scratch resistance
- an improved stiffness/weight ratio
- a higher resistance to ageing/weathering (sun irradiation)
- possibility to provide a better finishing/aspect
- possibility to have a transparent trim element (for back lighting, screen integration, . . . .)
- possibility to have a glare control treatment and/or anti-finger prints coating
- a better recyclability
- a seamless connectivity with nomadic devices
- the glass trim element can harbor seamless audio functions (audioglass)
- a better hygienic aspect
- a better comfort/convenience
- some functionalities may be tailor-made for the occupant
- possibility of reconciliation of many different softwares into one single place for one Operating System.

The present invention applies to trim or decorative elements present in the interior of a vehicle as doors handles contours, door panels, trim elements of the dashboard, back of seats . . .

Thus, the invention also relates to an assembly for motor vehicle's interior and more particularly for a car's interior comprising a glass trim element and a plastic frame as described above. The advantages of such as assembly are the same cited above.

The invention claimed is:

1. A method for fixing a glass trim element into a motor vehicle's interior body, comprising fixing the glass trim element to a plastic frame to provide an assembly that is integrated to the motor vehicle's interior body,
   wherein the plastic frame is provided below and around the glass trim element, and
   wherein the glass trim element is beforehand assembled to the plastic frame before being integrated into the motor vehicle's interior body.

2. The method according to claim 1, wherein the motor vehicle is a car.

3. The method according to claim 1, wherein the glass trim element is a trim element mounted onto an upper part of a center console body on which functional elements and the glass trim element are mounted.

4. The method according to claim 1, wherein the plastic frame matches a shape curvature of the glass trim element.

5. The method according to claim 1, wherein the glass trim element has a front and a back and the plastic frame is provided on a back of the glass trim element.

6. The method according to claim 1, wherein the plastic frame is provided on the glass trim by gluing, using a tape, a thermoplastic or a thermoset or by mechanical fixation.

7. The method according to claim 1, wherein the plastic frame is made of a material selected from the group consisting of polybutylene terephthalate, polycarbonate-acrylonitrile butadiene styrene, polyamide PA6, polyamide copolymer PA66, polyoxymethylene, polypropylene, thermoplastic elastomers and thermoset material.

8. The method according to claim 1, wherein the glass trim element is a glass of soda-lime-silica, aluminosilicate or borosilicate type.

9. The method according to claim 1, wherein the glass trim element is provided with a safety backing.

10. The method according to claim 1, wherein the glass trim element has a basic composition comprising, in a content expressed as percentages by total weight of glass:

| | |
|---|---|
| $SiO_2$ | 55-85%, |
| $Al_2O_3$ | 0-30%, |
| $B_2O_3$ | 0-20%, |
| $Na_2O$ | 0-25%, |
| CaO | 0-20%, |
| MgO | 0-15%, |
| $K_2O$ | 0-20%, and |
| BaO | 0-20%. |

11. The method according to claim 1, wherein the glass trim element has a basic composition comprising, in a content expressed as percentages by total weight of glass:

$65 \leq SiO2 \leq 78\%$,
$5 \leq Na_2O \leq 20\%$,
$0 \leq K_2O < 5\%$,
$1 \leq Al_2O_3 < 6\%$,
$0 \leq CaO < 4.5\%$, and
$4 \leq MgO \leq 12\%$; and
the glass has a (MgO/(MgO + CaO)) ratio $\geq 0.5$.

12. The method according to claim 1, wherein the glass trim element extends over a majority of a surface of an upper part of a console base.

13. An assembly for a motor vehicle's interior, comprising:
   a glass trim element, and
   a plastic frame, wherein the plastic frame is provided below and around the glass trim element, and wherein the glass trim element is beforehand assembled to the plastic frame before being integrated into the motor vehicle's interior body.

14. The assembly according to claim 13, wherein the motor vehicle is a car.

15. The assembly according to claim 13, wherein the glass trim element is mounted onto an upper part of a center console body on which functional elements and the trim element are mounted.

16. The assembly according to claim 13, wherein the glass trim element is provided as a door cover or as an armrest cover.

17. The assembly according to claim 13, wherein the glass trim element comprises one or more touch functionalities.

18. The assembly according to claim 13, wherein the plastic frame shape is adapted to match a geometry of the glass trim element.

19. A method for fixing a glass trim element into a motor vehicle's interior body, comprising:

assembling the glass trim element into a plastic frame to form an assembly, and subsequently integrating the assembly into the motor vehicle's interior body, wherein the frame is provided below and around the glass trim element, and wherein the glass trim element is formed from a float-glass-sheet.

20. The method according to claim 1, wherein the trim element does not host electronic or other functional devices.

* * * * *